United States Patent [19]

Balant et al.

[11] Patent Number: 4,588,957
[45] Date of Patent: May 13, 1986

[54] OPTICAL PULSE COMPRESSION APPARATUS AND METHOD

[75] Inventors: Anne C. Balant, Mahopac; Daniel R. Grischkowsky, Peekskill, both of N.Y.

[73] Assignee: International Business Machines Corporation, Armonk, N.Y.

[21] Appl. No.: 386,492

[22] Filed: Jun. 9, 1982

[51] Int. Cl.[4] .................................................. G02F 1/16
[52] U.S. Cl. .................................. 330/4.3; 350/162.17; 307/430; 455/610
[58] Field of Search .................... 330/4.3; 332/7.51; 350/162.17, 168, 354; 307/425, 430; 455/610-612

[56] References Cited

U.S. PATENT DOCUMENTS 3,999,839 12/1976 Bjorkland et al. .................. 350/354

OTHER PUBLICATIONS

Shank et al., "Compression of Femtosecond Optical Pulses", 5/1/82, pp. 761-763, Appl. Phys. Lett., vol. 40, #9.
Alfano et al., "Electronic Mechanism . . . Self Phase Modulation", 7/72, pp. 433-438, Phys. Rev. A., vol. 6, #1.
Nakatsuka et al., "Recompression of . . . Optical Fibers", 1/81, pp. 13-15, Optics Letters, vol. 6, #1.
Crosignani et al., "Self-Phase Modulation . . . Optical Fibers", 12/78, pp. 1-9, ntis n 80-11318/6.
Agostinelli et al., "Optical Pulse Shaping with Grating Pair", 7/15/79, pp. 2500-2504, Applied Opt., vol. 18, #14.
Nakatsuka et al., "Nonlinear picosecond-pulse . . . Dispersion", 9/28/81, pp. 910-913, Phys. Rev. Lett., vol. 47, #13.
Fisher et al., "Pulse Compression . . . Chains II," 1/75, pp. 46-52, IEEE. J.Q.E., vol. QE-11, #1.
Fisher et al., "Dispersive Temporal Compression . . . Amplifier Chains", 11/5/73, pp. 1-37, ntis uc1d-16405.

Primary Examiner—Nelson Moskowitz
Attorney, Agent, or Firm—Ronald L. Drumheller

[57] ABSTRACT

An optical pulse is passed through a nonlinear dispersive delay line, which chirps the pulse by the nonlinear process of self-phase modulation and simultaneously and interactively broadens the pulse by the process of group velocity dispersion. The broadened and chirped pulse is then passed through a linear dispersive delay line, which compresses the pulse to a width less than the original pulse. By making the optical pulse suitably intense, a single-mode optical fiber may act as the nonlinear dispersive delay line. A near-resonant atomic vapor cell or a grating pair may act as the linear dispersive delay line.

25 Claims, 4 Drawing Figures

FIG. 3
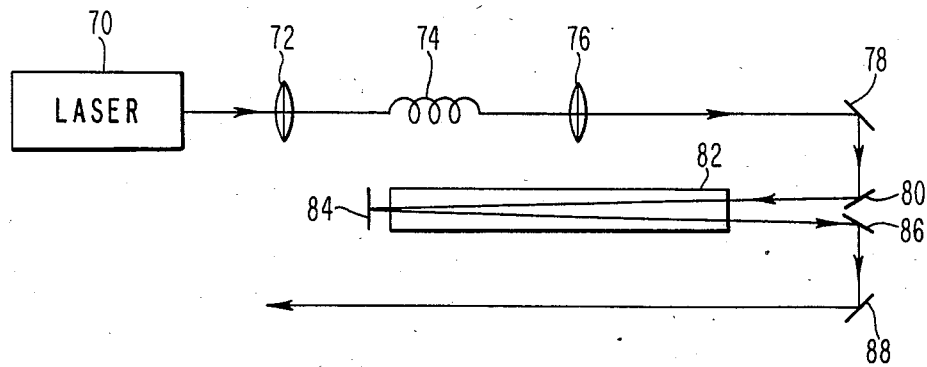
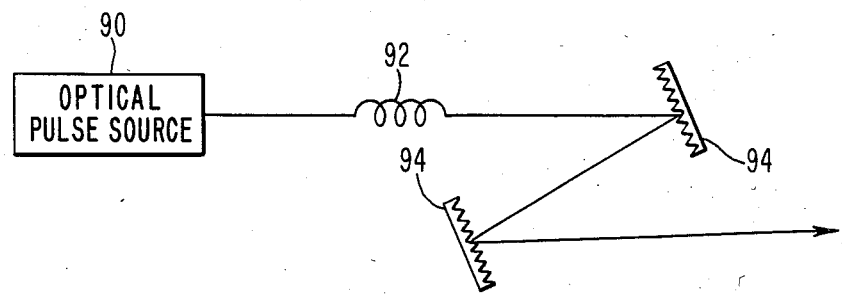
FIG. 4

OPTICAL PULSE COMPRESSION APPARATUS AND METHOD

The U.S. Government has rights in this invention pursuant to Contract No. N00014-76-0907 awarded by the Office of Naval Research.

DESCRIPTION

1. Technical Field

This invention relates to pulse width compression and more particularly to optical pulse compression using self-phase modulation and group velocity dispersion.

2. Background Art

Optical pulses having a width as narrow as possible are desired in many fields, including optical communications and optical instrumentation. Accordingly, methods and apparatus for compressing or narrowing the width of an existing optical pulse are of particular interest and utility in such fields.

Pulse compression methods are based upon an idea originally developed for chirp radar, namely, that when a pulse having a proper frequency sweep is sent through a frequency dispersive delay line, it becomes narrowed or temporally compressed. The propagation velocity of light in a dispersive delay line varies with instantaneous frequency. Therefore, portions of an optical pulse having different instantaneous frequency travel at different speeds (group velocity) through a dispersive delay line.

The chirp (frequency sweep) of the pulse and the frequency dispersion and length of the delay line are selected such that the leading edge of the frequency swept pulse is delayed by just the right amount that it overlaps the trailing edge of the pulse at the output of the delay line. Several ways are known to produce a frequency swept (chirped) optical pulse. Some early lasers generated light pulses which inadvertently had a frequency sweep and thus could be compressed to some extent without deliberately generating a chirp merely by passing the laser pulse through a delay line with suitable dispersion.

The conventional approach is to generate the frequency sweep by using an opto-electronic method. Unfortunately, the use of an electro-optic technique to produce the chirp is practical only when the optical pulse width is about a nanosecond or more. Electro-optic techniques do not exist which will produce a large bandwidth chirp when the pulse width is much less than a nanosecond (i.e., in the picosecond range or shorter). The chirp bandwidth should be as large as possible because the degree of compression which is subsequently achieved during passage of the pulse through the dispersive delay line increases directly with the chirp bandwidth. Since optical pulses with a width much less than a nanosecond are now readily available, electro-optic techniques for producing the chirp are becoming impractical.

An optical pulse can be chirped also by passing it through an optical medium having a nonlinear index of refraction which varies with light intensity. Such a nonlinear optical medium propagates light at a speed which varies with instantaneous light intensity. The more intense central region of a light pulse thus is delayed (or speeded up) slightly with respect to the less intense adjacent edge regions of the pulse. As a consequence, the instantaneous wavelength (or frequency) on one side of the center of the pulse is slightly reduced while the instantaneous wavelength (or frequency) on the other side of the center is slightly increased. This nonlinear process is called self-phase modulation and results in the central region of the pulse having an instantaneous wavelength which linearly increases or decreases (i.e., is linearly chirped).

Unfortunately, the self-phase modulation chirp only extends over the center region of the optical pulse. As a direct consequence of impressing a proper chirp at the center of the pulse by self-phase modulation, an opposite chirp is impressed on each edge of the pulse. Consequently, while the center is compressed by subsequent passage through an appropriate dispersive delay line, the edges (or wings) of the pulse are simultaneously expanded (temporally broadened).

Another problem with using self-phase modulation to chirp an optical pulse arises from the spatial intensity profile which characterizes most optical pulses, including laser beam pulses. Since the intensity of an optical pulse varies radially from the center of the beam, so also does the magnitude of the chirp and the resulting compression radially vary with distance from the beam center.

Still another problem associated with the use of nonlinear optical media for pulse compression is that, in addition to producing self-phase modulation, the nonlinearity also causes self-focusing, which leads to instabilities in the self-phase modulation and the spatial intensity profile.

These prior art techniques are described, for example, in the following references:

J. Klauder, A. Price, S. Darlington and W. Albersheim, "The Theory and Design of Chirp Radars", The Bell Sys. Tech. Jour., Vol. 39, No. 4, pp. 745–808 (1960);

R. Fisher, P. Kelley and T. Gustafson, "Sub-picosecond Pulse Generation Using the Optical Kerr Effect," Appl. Phys. Lett., Vol. 14, No. 4, pp. 140–143 (1969);

A. Laubereau, "External Frequency Modulation and Compression of Picosecond Pulses," Phys. Lett., Vol. 29A, No. 9, pp. 539–530 (1969);

D. Grischkowsky, "Optical Pulse Compression," Appl. Phys Lett., Vol. 25, No. 10, pp. 566–568 (1974);

R. Fisher and W. Bischel, "Numerical Studies of the Interplay Between Self-Phase Modulation and Dispersion for Intense Plane-Wave Laser Pulses," J. Appl. Phys., Vol. 46, No. 11, 4921–4934 (1975);

R. Lehmberg and J. McMahon, "Compression of 100-psec Laser Pulses", Appl. Phys. Lett., Vol. 28, No. 4, pp. 204–206 (1976);

R. Lehmberg, J. Reintjes and R. Eckardt, "Optical Pulse Squaring Effects in a Dispersive Delay Line," Optics Comm., Vol. 22, No. 1, pp. 95–98 (1977);

J. Wigmore and D. Grischkowsky, "Recompression of Light," IEEE Jour. Quan. Elect., Vol. QE-14, No. 4, pp. 310–315 (1978);

H. Nakatsuka and D. Grischkowsky, "Recompression of Optical Pulses Broadened by Passage Through Optical Fibers," Optics Lett., Vol. 6, No. 1, pp. 13–15 (1981).

DESCRIPTION OF THE DRAWINGS

FIG. 3 schematically shows optical pulse compression apparatus in accordance with the present invention.

FIG. 4 schematically shows another optical pulse compression apparatus in accordance with the present invention.

DISCLOSURE OF THE INVENTION

In accordance with this invention, an optical pulse is compressed using a combination of self-phase modulation and group velocity dispersion of the same sign followed by group velocity dispersion of opposite sign.

Figure 1:
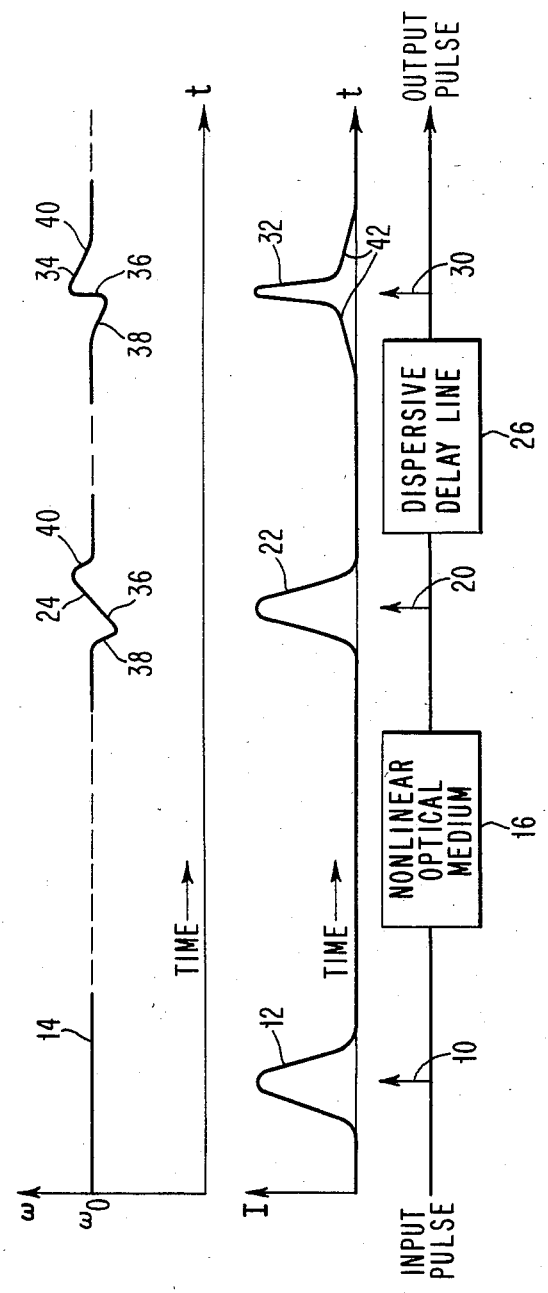
FIG. 1 illustrates the prior art process of compressing an optical pulse using self-phase modulation followed by group velocity dispersion.

FIG. 1 illustrates the prior art process of compressing an optical pulse using self-phase modulation and group velocity dispersion. Input pulse 10 has a hyperbolic secant pulseshape which is characteristic of short pulses obtained from a laser and is described by the intensity pulseshape 12 and instantaneous frequency waveform 14 graphically illustrated immediately above pulse 10.

Input pulse 10 is passed through a nonlinear optical medium 16 having an index of refraction of the form $n = n_0 + n_2 E^2$, where $n_0$ is the ordinary index of refraction and E is the electrical field strength of the light pulse. It can be shown that this type of nonlinearity will produce a change in the input optical pulse instantaneous frequency which is proportional to the time derivative of the intensity pulseshape 12. The amount of frequency modulation (self-phase modulation) is $$\Delta\omega = -\frac{\omega_o}{2c} z\, n_2 \frac{\partial E}{\partial t},$$

where $\omega_0$ is the frequency of the input pulse, z is the distance the pulse propogated through the nonlinear medium and c is the velocity of light.

As a result of passing through the nonlinear optical medium 16, pulse 10 becomes pulse 20 described by the intensity pulseshape 22 and instantaneous frequency waveform 24, graphically illustrated immediately above pulse 20. Pulseshape 22 is substantially the same as pulseshape 12, though it is usually attenuated to some extent. Waveform 24 is the same as waveform 14 except that the instantaneous frequency has been modified in accordance with the equation above.

Pulse 20 is then passed through a dispersive delay line 26 where the group velocity (light propagation speed) varies linearly with the instantaneous frequency ($\omega$). The dispersion is chosen so that after passage through the delay line the rear of the pulse has caught up with the front. Therefore the pulse becomes compressed. As a result of passing through the dispersive delay line 26, pulse 20 becomes pulse 30 described by the intensity pulseshape 32 and instantaneous frequency waveform 34 graphically illustrated immediately above pulse 30. As shown, the compression process occurs only over the central region 36 having the positive linear chirp. At the edges of the pulse 20, negative chirps 38 and 40 have the wrong sense so that these parts of pulse 20 become broadened instead and form undesirable extended wings 42 on pulse 32. The width of pulse 32 at the half-maximum intensity (which does not include wings 42) is proportional to $1/\Delta\omega$.

Figure 2:
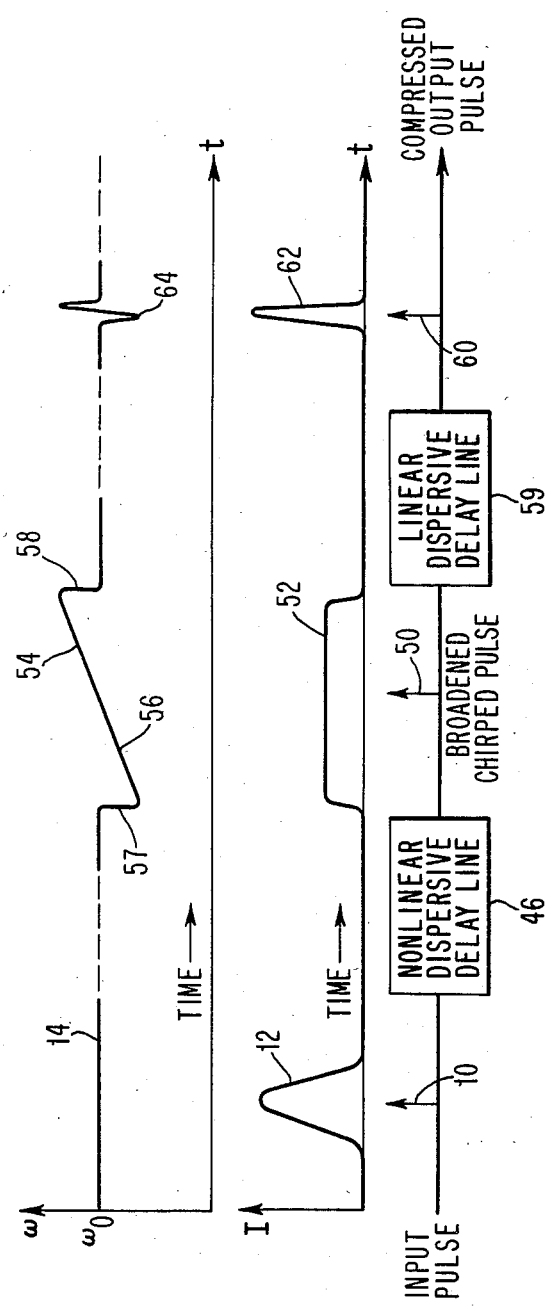
FIG. 2 illustrates the process of the present invention for compressing an optical pulse.

FIG. 2 illustrates the process of the present invention, which also employs self-phase modulation in the compression of optical pulses but which does so without broadening the pulse edges (i.e., without extending the wings). The key difference is the addition of a significant amount of group velocity dispersion to the nonlinear optical element 46. The sense or sign of the added group velocity dispersion must be the same as the nonlinearity. Thus, if the nonlinearity is positive acting, the added group velocity dispersion also must be positive acting. By adding to the nonlinear optical element group velocity dispersion having the same sign (positive or negative) as the nonlinearity, pulse 50 becomes not only chirped by passage through element 46 but also broadened as well. The surprising result of combining significant broadening dispersion with a nonlinearity in the same optical element is that the broadening effect due to group velocity dispersion and the self-phase modulation effect interact with each other to produce a pulse 50 which has a chirp that extends over more of the pulseshape than without the significant broadening.

Without adding significant broadening dispersion to the nonlinear element, the chirp which results from the self-phase modulation is controlled by the intensity pulseshape, since the self-phase modulation is proportional to the derivative of the intensity pulseshape. With a hyperbolic secant squared pulseshape, for example, self-phase modulation alone results in a chirp which extends over only about 59 percent of the pulse. The extended wings arise from the other 41 percent of the pulse. By adding sufficient broadening dispersion to the nonlinear element, the central chirp which results can be extended over substantially the entire pulseshape. This is illustrated by the intensity pulseshape 52 and instantaneous frequency waveform 54 describing pulse 50.

As illustrated, the dispersion associated with the nonlinear element results in a broader pulseshape 52 than the original pulseshape 12. The most significant feature, however, is that the positive chirp region 56 now extends over substantially the entire pulseshape. The oppositely chirped regions 57, 58 now describe very little of the pulseshape. In actual experiments, the portion of the pulseshape described by these oppositely chirped regions has been reduced in this way to less than 10 percent of the pulseshape.

As a result of having avoided the formation of significant oppositely chirped regions at the pulseshape edges, when the pulse 50 is compressed by linear dispersive delay line 59 to produce a compressed pulse 60, there are no significant wings associated therewith. Pulse 60 is described by the intensity pulseshape 62 and the instantaneous frequency waveform 64. It should be noted that in order for the linear dispersive delay line 59 to produce compression, the sign of the dispersion in the linear delay line must be opposite to the sign of the dispersion and nonlinearity of the nonlinear dispersive delay line.

BEST MODE FOR CARRYING OUT THE INVENTION

The principles of this invention are preferably implemented by using a single-mode optical fiber to form the nonlinear dispersive delay line and a near-resonant atomic vapor cell or a grating pair as the linear dispersive delay line.

FIG. 3 illustrates a practical embodiment. A mode-locked dye laser 70 generates one or more optical pulses which are focused by lens 72 into a single-mode optical fiber 74. The intensity of the optical pulses must be sufficiently high that the nonlinear term in the index of refraction of the single-mode optical fiber becomes sufficiently significant that self-phase modulation occurs. Optical pulses of 10 watts were sufficient in our experiments to produce the desired effect. It is expected that at least 1 watt pulses are needed to produce a significant self-phase modulation with a single-mode optical fiber of reasonable length.

The frequency of the pulses to be compressed also must be sufficiently high that they experience a significant positive group velocity dispersion within The fiber length needed to produce the desired self-phase modulation. Since most single-mode optical fibers have positive group velocity dispersion at a wavelength below about 1.3 micrometers and have a negative group velocity dispersion above about 1.3 micrometers, the wavelength of the input optical pulse generally must be below 1.3 micrometers if the nonlinear element is a single-mode optical fiber. Preferably the wavelength should be below 1.0 micrometers in order to get sufficient dispersion within a reasonable fiber length. The required length of the single-mode fiber as well as the required frequency of the input pulse and the required intensity of the input pulse are all related to each other, so that as one is varied the others must also be varied to compensate. The length of the fiber, the frequency of the pulse and the intensity of the pulse are selected such that the combined action of self-phase modulation and group velocity dispersion broadens both the pulseshape and the instantaneous frequency waveform, producing an output pulse which is described as completely as possible by a linear frequency chirp. At least 75 percent of the pulse-shape must be described by the central linear frequency chirp if significant reduction of the compressed pulse wings is desired. Preferably, 90 percent and ideally more than 95 percent of the broadened pulseshape should be described by the central chirp. In order to get at least 75 percent of the pulseshape described by the linear frequency chirp, the input pulse must be temporarily broadened by passage through the nonlinear element. A temporal broadening of at least 100 percent is preferred. Temporal broadening to nearly four times the input pulse width has been achieved during experiments with excellent results.

The broadened and chirped pulse emerging from the single-mode optical fiber is focused by lens 76 and deflected by mirrors 78, 80 into a near-resonant atomic vapor cell 82. The atomic vapor cell may contain sodium vapor, for example, in which case the wavelength of the input pulse could be about 5874 Å in order to be near resonant with the 5890 Å sodium line. Pulses of this frequency are available, for example, from a synchronously pumped, mode-locked dye laser. Mirror 84 reflects the pulse back through the vapor cell 82 to mirrors 86, 88. The near-resonant atomic vapor cell 82 acts as a negative dispersive delay line. The length of cell 82 is selected such that the leading edge of the pulse is delayed sufficiently to coincide temporally with the trailing edge of the pulse.

Detailed consideration of design and experimental aspects of this embodiment are set forth in our journal article "Nonlinear Picosecond-Pulse Propagation through Optical Fibers with Positive Group Velocity Dispersion", by H. Nakatsuka, D. Grischkowsky and A. Balant, Phys. Rev. Lett., Vol. 47, No. 13, pp. 910–913 (September 1981), which is hereby fully incorporated by reference. Further, consideration of theoretical and design aspects of this invention are set forth in another article entitled "Optical Pulse Compression Based on Enhanced Frequency Chirping", by D. Grischkowsky and A. Balant, Appl. Phys. Lett., Vol. 41, No. 1, pp. 1–3 (1982), which was publically available from the IBM Thomas J. Watson Research Center, Distribution Services 38-066, Post Office Box 218, Yorktown Heights, N.Y. 10598 as IBM Research Report RC9272 (#40747) dated Feb. 23, 1982, and is therefore also incorporated by reference.

FIG. 4 illustrates another practical embodiment. Optical pulse source 90 is coupled to a single-mode optical fiber 92, acting as the nonlinear dispersive element. At the other end, optical fiber 92 is coupled to a grating pair 94 acting as the linear dispersive element.

Certain modifications and changes would be apparent to those of ordinary skill and may be made without departing from the spirit and scope of this invention. For example, while the invention has been described with a positive acting nonlinearity producing the self-phase modulation, it would be apparent that should a suitable optical propagation medium be discovered having a negative acting nonlinearity and a negative dispersion within a useful optical frequency range, it could be used in place of the single-mode optical fiber having a positive acting nonlinearity and dispersion. Also, other optical media may be discovered which have a suitably large positive nonlinearity and positive dispersion within a useful optical range. Alternative linear dispersive delay line elements could be used as well.

Having thus described our invention, what we claim as new, and desire to secure by Letters Patent is:

1. Apparatus for compressing an optical pulse, comprising:
   a nonlinear dispersive optical delay line receiving the input optical pulse to be compressed, said nonlinear delay line having a group velocity dispersion and nonlinear index of refraction with the same sign, said nonlinear index of refraction producing self-phase modulation which interacts with group velocity dispersion to produce an intermediate pulse at the output of said nonlinear delay line which is broader than said input pulse and has linear frequency chirp; and
   a linear dispersive optical delay line receiving said intermediate pulse, said linear delay line having a group velocity dispersion of opposite sign from the group velocity dispersion of said nonlinear delay line and of sufficient magnitude to compress said intermediate pulse to a width less than said input optical pulse.

2. Apparatus as defined in claim 1 wherein said compressed pulse has wings no farther extended than said input pulse.

3. Apparatus as defined in claim 1 wherein said linear frequency chirp describes a larger portion of the energy of said intermediate pulse than could be described by using self-phase modulation effect alone.

4. Apparatus as defined in claim 1 wherein said linear frequency chirp describes at least 75 percent of the energy of said intermediate pulse.

5. Apparatus as defined in claim 1 wherein said linear frequency chirp describes at least 90 percent of the energy of said intermediate pulse.

6. Apparatus as defined in claim 1 wherein said linear frequency chirp describes at least 95 percent of the energy of said intermediate pulse.

7. Apparatus as defined in claim 1 wherein the group velocity dispersion and the nonlinear index of refraction of said nonlinear dispersive optical delay line are both positive and the group velocity dispersion of said linear dispersive optical delay line is negative.

8. Apparatus as defined in claim 1 wherein said nonlinear dispersive optical delay line is a single-mode optical fiber.

9. Apparatus as defined in claim 8 wherein said linear dispersive optical delay line is a near-resonant atomic vapor delay line.

10. Apparatus as defined in claim 9 wherein the atomic vapor of said atomic vapor delay line is sodium vapor.

11. Apparatus as defined in claim 8 wherein said linear dispersive optical delay line is a grating pair.

12. Apparatus as defined in claim 8 wherein the wavelength of said input optical pulse is less than 1.3 micrometers.

13. Apparatus as defined in claim 12 wherein the wavelength of said input optical pulse is less than 1.0 micrometer.

14. Apparatus as defined in claim 13 wherein the wavelength of said input optical pulse is about 5,900 angstroms.

15. Apparatus as defined in claim 8 wherein said input optical pulse has a half-maximum full width of less than 100 picoseconds.

16. Apparatus as defined in claim 8 wherein said input optical pulse has a peak power of at least 1 watt.

17. Apparatus as defined in claim 8 wherein said input optical pulse has a peak power of about 10 watts.

18. Apparatus as defined in claim 1 wherein the length and dispersion of said nonlinear dispersive delay line is sufficient to produce an intermediate pulse which is at least twice as broad as said input pulse.

19. A method for compressing an optical pulse, comprising the steps of:
temporally broadening and frequency chirping an input optical pulse through the combined action of group velocity dispersion and self-phase modulation having the same sign; and
compressing the broadened and chirped pulse through the action of group velocity dispersion of sign opposite to the sign of the self-phase modulation.

20. A method as defined in claim 19 wherein the chirp describes a larger portion of the pulse energy than could be described by a chirp produced through the sole action of self-phase modulation.

21. A method as defined in claim 19 wherein the chirp describes at least 75 percent of the pulse energy.

22. A method as defined in claim 19 wherein the chirp describes at least 90 percent of the pulse energy.

23. A method as defined in claim 19 wherein the chirp describes at least 95 percent of the pulse energy.

24. A method as defined in claim 19 wherein the input pulse is temporally broadened to at least twice the input pulse width while being chirped by self-phase modulation.

25. A method as defined in claim 19 wherein the compressed pulse has no more than one half the width of the input pulse and the base of the pulse has not been extended thereby.

* * * * *